United States Patent [19]

Pinkus

[11] Patent Number: 5,567,937
[45] Date of Patent: Oct. 22, 1996

[54] NIGHT VISION DEVICE WAVELENGTH TEST PATTERN

[75] Inventor: Alan R. Pinkus, Fairborn, Ohio

[73] Assignee: The United States of America as represented by the Secretary of the Air Force, Washington, D.C.

[21] Appl. No.: 500,302

[22] Filed: Jul. 10, 1995

[51] Int. Cl.⁶ ..................................... G01J 1/42
[52] U.S. Cl. .................. 250/252.1; 250/332; 345/83
[58] Field of Search ............... 250/252.1 A, 332, 250/339.02, 339.05, 495.1; 345/82, 83

[56] References Cited

U.S. PATENT DOCUMENTS

| | | | |
|---|---|---|---|
| 4,271,408 | 6/1981 | Teshima et al. | 345/83 |
| 4,695,720 | 9/1987 | Rieder et al. | 250/252.1 A |
| 4,965,448 | 10/1990 | Morse et al. | 250/252.1 |
| 4,967,373 | 10/1990 | Ginsburg | 345/83 |
| 5,070,239 | 12/1991 | Pinkus | 250/252.1 |
| 5,184,114 | 2/1993 | Brown | 345/83 |
| 5,200,622 | 4/1993 | Rouchon et al. | 250/334 |
| 5,204,532 | 4/1993 | Rosenthal | 250/341 |
| 5,206,511 | 4/1993 | Apperson et al. | 250/343 |
| 5,323,002 | 6/1994 | Sampsell et al. | 250/252.1 |
| 5,359,345 | 10/1994 | Hunter | 345/83 |

OTHER PUBLICATIONS

Evershed et al. "A Field Test Set for Night Vision Devices" Optical Engineering/vol. 15 No. 3/May–Jun. 1976, pp. 251–254.

Humphreys "An Image Scanner for Testing Night Vision Systems" Electro–Optics/Laser International/9–11 Mar. 1976/pp. 183–187.

Grinberg et al. "Visible to Infrared Image Converter for Dynamic Infrared Target Simulation Applications" SPIE vol. 226 IIST (1980)/pp. 129–132.

Primary Examiner—Davis L. Willis
Assistant Examiner—Kiet T. Nguyen
Attorney, Agent, or Firm—Gerald B. Hollins; Thomas L. Kundert

[57] ABSTRACT

A night vision device test arrangement for determination of spectral sensitivity field of view and other operating characteristics of night vision devices. The test arrangement includes a controllable array of radiant energy emitters such as narrow-band light emitting diode elements used to display a night vision device test pattern. The displayed test pattern may be located in the infrared or infrared and visible spectrum regions and may be altered by user command to have different configurations including different physical size, shape and array location and different spectral content. Control of the test pattern may employ a computer or a manual selection apparatus. The disclosed apparatus is especially suited to in-the-field GO/NO GO rapid performance verification of night vision device equipment. Military and non-military uses are contemplated.

18 Claims, 4 Drawing Sheets und 5,567,937

NIGHT VISION DEVICE WAVELENGTH TEST PATTERN

RIGHTS OF THE GOVERNMENT

The invention described herein may be manufactured and used by or for the Government of the United States for all governmental purposes without the payment of any royalty.

BACKGROUND OF THE INVENTION

This invention concerns the field of rapidly achieved good/bad or GO/NO GO measurement and testing as related to night vision equipment.

Although several different characteristics are useful in evaluating night vision devices an especially important and critical characteristic for any such equipment is its spectral sensitivity or its gain at different spectral input wavelengths, i.e. its gain in response to different "color" inputs, inputs which may range between the visible and the near-infrared visual spectral wavelength ranges. Formally of course the term "color" relates to wavelengths in the spectral range between 400 and 700 nanometers where the human eye is responsive. Since the present invention relates to night vision equipment having principal spectral response in the near-infrared region, the spectral range between 650 and 1000 nanometers of wavelength, the wavelength changes of present concern can be referred to as color changes only in a generic sense. Nevertheless it is the intent of the invention to provide a rapidly achievable and accurate evaluation of a night vision device's response to inputs of differing spectral location and differing configuration.

The concept of spectral response in fact largely dictates each specific night vision device deployment. For example, there are Class A and Class B type night vision goggles (NVGs) which are filtered to have lower cutoff points at wavelengths of 625 and 665 nanometers, respectively. In order to use such goggles in an aircraft, the cockpit lighting must be restricted to wavelengths below the sensitivity of the goggles that are to be used in that cockpit. Since the cockpit lighting and NVG spectral characteristics thusly interact, the current military specification, MIL-L-85762, provides for such Class A, 625 nanometer, minus blue filtered, and Class B, 665 nanometer, minus blue filtered, night vision imaging systems for aircraft cockpit use. The spectral sensitivity or gain of the NVGs are thus a critical operational characteristic due to an interaction with cockpit lighting. A similar characteristic is of concern with respect to the spectral transmissivity of the aircraft' windscreen and with respect to vehicular mounted and other radiant energy transmission with ground-based night vision devices. Because of these close spectral constraints and because night vision device equipment can change in spectral response characteristics during extended field use, it is desirable to provide simple and accurate testing equipment along with the deployment of night vision device equipment in a field operating environment.

Currently, night vision device spectral sensitivity or gain measurements made by the manufacturers of such equipment are accomplished using custom optical test setups which are manually operated and which vary in implementation between manufacturers. Such measuring of a night vision device spectral sensitivity can be difficult and tedious, however, since the energy levels are very low and the spectral range of interest covers at least the wave-lengths of 300 nanometers through 1600 nanometers-while usually considering a few nanometers of wavelength resolution. Such measurements are in fact often done on a wavelength by wavelength basis using a complex optical and mechanical test bed. In the field of using night vision device equipment however, this wavelength by wavelength measurement arrangement is far too cumbersome and costly and is therefore not viable or viable only with considerable abbreviation. There is therefore perceived to be needed in this field an easily accomplished spectral sensitivity test which can be employed for rapid testing of night vision device equipment, i.e., for the GO/NO GO testing of such equipment. The present invention is believed to provide this capability.

The U.S. patent art indicates the presence of inventive activity in the field of night vision devices and their testing. One such patent is U.S. Pat. No. 5,200,622 issued to J. M. Rouchon et at, a patent which is concerned with an infrared observation system having a self-checking feature. The Rouchon patent uses the Narcissus effect parasitic image which is imposed on the useful image of a pod mounted or other infrared system to achieve the self-checking feature. The Rouchon patent appears to be only distally related to the spectrum testing concept of the present invention, however.

The invention of R. D. Rosenthal in U.S. Pat. No. 4,969,115 is of general background interest with respect to the present invention in the sense that it discloses use of infrared spectrum energy to achieve quantitative measurements of organic samples and also an arrangement for determining the similarity of a sequence of these organic samples. The Rosenthal apparatus is however only distally, if at all, related to night vision equipment and its calibration.

The additional invention of R. D. Rosenthal in U.S. Pat. No. 5,204,532 is also of general background interest with respect to the present invention in the sense that it discloses use of near-infrared spectral calibration standards, i.e. spectral clusters of known calibration constant, to achieve accurate calibration of a blood glucose measuring system. This Rosenthal apparatus is also however only distally, if at all, related to night vision equipment and its calibration.

Similarly the patent of J. R. Apperson et al., U.S. Pat. No. 5,206,511, is of general background interest with respect to the present invention. The Apperson patent discloses an arrangement for calibrating an infrared apparatus of the blood gas analyzer type, a device of the nature used in surgical operating rooms to measure a patient's breath gasses. This calibration is achieved using known standard elements which have predetermined numeric values of radiation reflection or absorption. The Apperson apparatus is however, also only distally, if at all, related to night vision equipment and its calibration.

The invention of P. G. Morse in U.S. Pat. No. 4,965,448 is also of general background interest with respect to the present invention in the sense that it discloses use of a calibration standard in an infrared detector system. The Morse apparatus however also appears only distally, if at all, related to night vision equipment and its spectral range calibration.

The invention of J. B. Sampsell et al. in U.S. Pat. No. 5,323,002 is also of interest with respect to the present invention, since it discloses use of a calibration arrangement in an optical system. In particular the Sampsell et al. system uses a spatial light modulator to achieve a desired mix of different temperature or different color-operated calibration sources. The Sampsell apparatus also discloses the use of a two or three point calibration arrangement, output to input calibration of an optical system and storage of a generated correction factor to correct the output to input calibration. The Sampsell apparatus appears only distally related to night vision equipment and its spectral range calibration.

The prior patent of the inventor named in the present patent document, U.S. Pat. No. 5,070,239, issued to A. R. Pinkus, is also of interest with respect to the present invention. This patent discloses an NVG testing arrangement which includes an input signal source and an NVG output measuring apparatus for evaluating the tested NVG's response to this input signal The Pinkus apparatus appears only distally related to night vision equipment spectral range calibration but is nevertheless hereby incorporated by reference into the present patent document.

Similarly the patent of E. N. Neigoff et al., U.S. Pat. No. 5,220,840, is also of general background interest with respect to the present invention. The Neigoff et al. patent discloses an arrangement for calibrating the lamps in an accelerated weathering or color fastness testing apparatus. This calibration is achieved with irradiation measurements of individual lamps in the sample testing area in combination with feedback control of lamp input power adjustment. The Neigoff et al. apparatus is however, also only distally, if at all, related to night vision equipment and its calibration.

Similarly the patent of L. V. Krusewski, U.S. Pat. No. 5,122,661, is of general background interest with respect to the present invention. The Krusewski patent discloses an arrangement for testing an infrared radiation detector of the type usable in steel mills and in testing electrical contacts for high electrical resistance, a tester employing a light emitting diode scalar output display. The Krusewski apparatus is however, also only distally, if at all, related to night vision equipment and its calibration.

SUMMARY OF THE INVENTION

The present invention provides a test pattern array of input signals which are suitable for the GO/NO GO or rapid testing of input spectral response sensitivity in night vision devices.

It is an object of the present invention therefore, to provide a convenient night vision device spectral response determination arrangement.

It is another object of the invention to provide for low cost spectral response determinations in a night vision device.

It is another object of the invention to provide a spectral response determination apparatus which may be used in a variety of environments including the equipment evaluation, and equipment testing or maintenance, environments.

It is another object of the invention to provide a spectral response determination which affords selectable spectral range and spectral resolution capabilities.

It is another object of the invention to provide a spectral response determination apparatus which affords selectable wavelength resolution.

It is another object of the invention to provide a spectral response determination apparatus which may be used with a variety of night vision device configurations.

It is another object of the invention to provide a spectral response determination which may be used with a night vision goggle, a night vision periscope, a night vision telescope, a night vision gun sight, a night vision spotting scope, a night vision video camera, night vision binoculars, and helmet mounted night vision apparatus.

It is another object of the invention to provide a spectral response evaluation apparatus which can be fabricated from ordinary and readily available components.

It is another object of the invention to provide a spectral response evaluation apparatus which is capable of detecting night vision device degradation resulting from extended field use.

It is another object of the invention to provide a spectral response evaluation apparatus which lends to quick look evaluation of a night vision device.

It is another object of the invention to provide a spectral response evaluation apparatus which can be useful in situations where complex laboratory evaluations of night vision device equipment is not warranted or feasible.

It is another object of the invention to provide a spectral response evaluation apparatus which utilizes the stability, small size, physical ruggedness and other advantages of solid state electronic devices in its embodiment.

Additional objects and features of the invention will be understood from the following description and claims and the accompanying drawings.

These and other objects of the invention are achieved by the method of verifying spectral and functional performance of a night vision device comprising the steps of:

forming a planar array of electrical energy to optical energy transducer elements which comprises transducer elements of selected different optical energy output wavelength disposed in selected array position locations;

generating a test pattern of energized array-comprised electrical energy to optical energy transducer elements, said test pattern including energized electrical energy to optical energy transducer elements of selected optical energy output wavelength and selected test pattern physical location;

controlling said test pattern in physical size, shape and spectral content, by electrically selecting one of an illuminated and quiescent state for, and an operating optical energy output intensity for, each electrical to optical energy transducer element in said array;

exposing an optical input port of said night vision device to said array-comprised test pattern of energized electrical energy to optical energy transducer elements; and examining an output image of said night vision device for correct pixel content in correct test pattern-determined location in response to said input port exposure.

DETAILED DESCRIPTION

Figure 1:
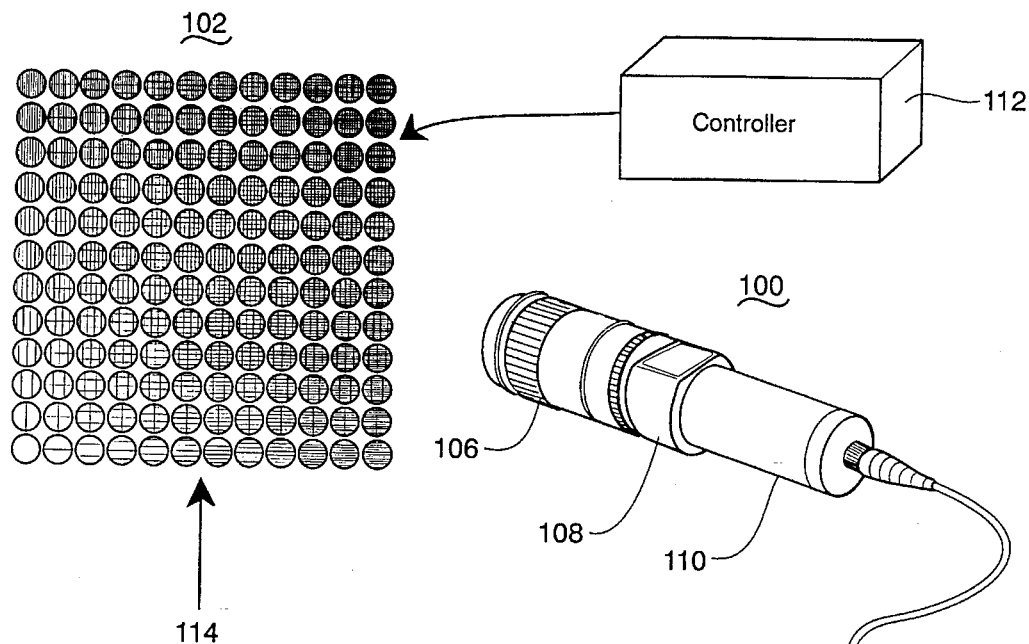
FIG 1 shows an overall view of apparatus which may be used to embody the present invention.

FIG. 1 in the drawings shows an overall perspective view of apparatus which may be involved in an embodiment of the present invention. In FIG. 1 there is shown a night vision device 100 which is receiving optical input data from a test pattern 102 displayed on an array of transducer elements 114. In the FIG. 1 drawing this input provides an output image which is evaluated by a night vision device readout apparatus 104. Also shown in FIG. 1 is a controller 112, which may be used in actively determining several characteristic of the test pattern 102 as is disclosed below herein. The controller 112 may be embodied in the form of a manually operated apparatus as shown in FIG. 1 or in the form of a digital computer, the latter of which can be of the personal computer type, for achieving a software-controlled and automated arrangement of the FIG. 1 invention. When used, such a computer may be embodied as a personal computer of many possible varieties, a computer which is based on the currently popular Intel® 386 or 486 central processor chips is for example more than adequate for this use.

In the FIG. 1 drawing, the night vision device 100 is shown to be comprised of a lens and filter assembly 106, an image intensifier tube assembly 108 and the input transducer portion 110 of a night vision device output measurement system. During human utilization of the FIG. 1 night vision device for either presently discussed testing or for field of use purposes, this input transducer portion 110 of a night vision device output measurement system is of course replaced with the user's eye.

The night vision device under test in the FIG. 1 apparatus, the night vision device 100, is therefore shown to be coupled to an output measurement system which is generally represented at 110 and 104 in the FIG. 1 drawing. A system suitable for accomplishing this night vision device output measurement function is disclosed in my U.S. Pat. No. 5,070,239 which is hereby incorporated by reference herein. For many contemplated uses of the present invention however, this system suitable for accomplishing the night vision device output measurement function, i.e., the system shown at 110 and 104 in FIG. 1, may be replaced by a measurement accomplished by the eye of a human observer. This replacement is in keeping with one aspect of the invention being the achievement of a rapidly accomplished or GO/NO GO type of evaluation of a night vision device. In filed GO/NO GO testing, it is often desirable to dispense with the rigor, cumbersome equipment and time consuming attributes of precisely measuring a night vision device output signal in favor of a less formal, but similar to the ultimate use, human assessment of responses to test pattern inputs. Such use of a human observer's eye to evaluate the tested night vision device output image and its pixel by pixel relationship with an input test pattern is shown in FIG. 2 of the drawings.

It is the intent of the invention therefore that the FIG. 1 components taken in combination provide for night vision device testing using a controllable sequence of spectrally narrowband, i.e., limited wavelength range, infrared energy inclusive signals of known intensity or known radiance level as input to the receiving port of the night vision device 100. It is the further intent of the FIG. 1 apparatus to provide user controllable variation of several attributes of the test pattern presented to the night vision device. These controllable attributes including the test pattern size, shape, brightness, element positioning within the pattern, pattern positioning on the retina array, pattern element energized time duration and so on.

Figure 2:
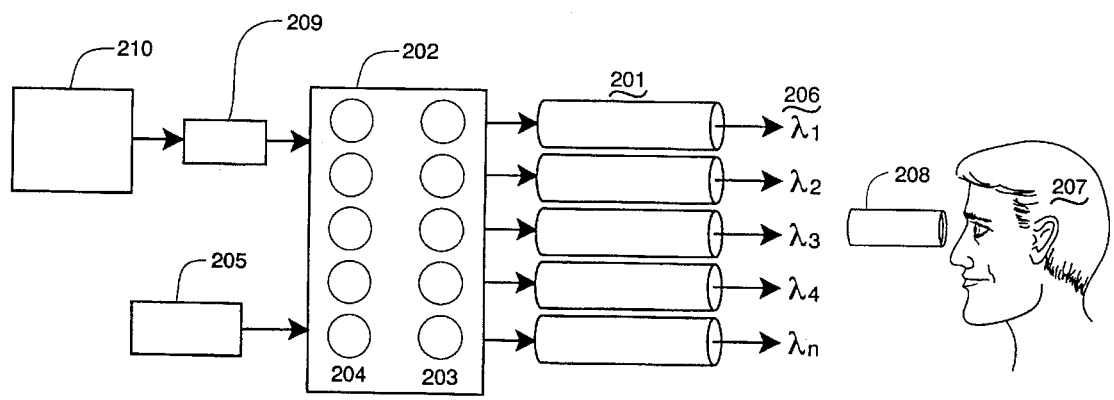
FIG. 2 shows a functional block diagram of apparatus which may be used to embody the present invention.

FIG. 2 in the drawings shows a functional block diagram for the testing system of the present invention. In the FIG. 2 drawing a linear array of light emitting diodes 201, which may for example range in output characteristics from the visible to the near infrared spectral wavelength range, is employed to generate a test pattern for input to the night vision device under test. The light emitting diodes of the array 201 may for example cover the wavelength range of 390 nanometers to 1200 nanometers, a range extending from the visible region of the spectrum to the near infrared region. Preferably this wavelength range is covered by a plurality of light emitting diode elements with the output spectrum peak or center for each light emitting diode's output being separated from each of its wavelength-adjacent counterpart light emitting diodes by a selected wavelength span such as 10 nanometers.

With such 10 nanometers wavelength separation between array light emitting diode elements, a full coverage of the spectral range between 390 and 1200 nanometers of wavelength (which involves a wavelength span of 810 nanometers) would require a total of 81 light emitting diode elements for example. The FIG. 2 arrangement of the invention of course includes less than these 81 light emitting diode elements and is therefore representative of test pattern arrays of more limited spectral range or alternately of arrays having greater wavelength separation between array elements. It is worthy of noting at this point that wavelength-adjacent light emitting diodes in such arrays, such as the diodes centered at wavelengths of 1190 and 1200 nanometers for example (when such adjacent wavelengths are used in an array), need not be located in physical adjacency in the FIG. 2 array 201 or the FIG. 1 array 114; this is a pattern-related concept and is described in more detail in connection with the test patterns of FIG. 5 through FIG. 8 in a later part of this specification.

In contrast to the early days of light emitting diode usage when a user could design equipment to employ any output color from an light emitting diode device, so long as it was red or green, light emitting diodes having this 10 nanometers of output wavelength separation or other relatively small values of wavelength separation are now available in the electrical/electronic component marketplace from a number of suppliers. One such supplier is currently Stanley Electric Company of Irvine, California.

Figure 10:
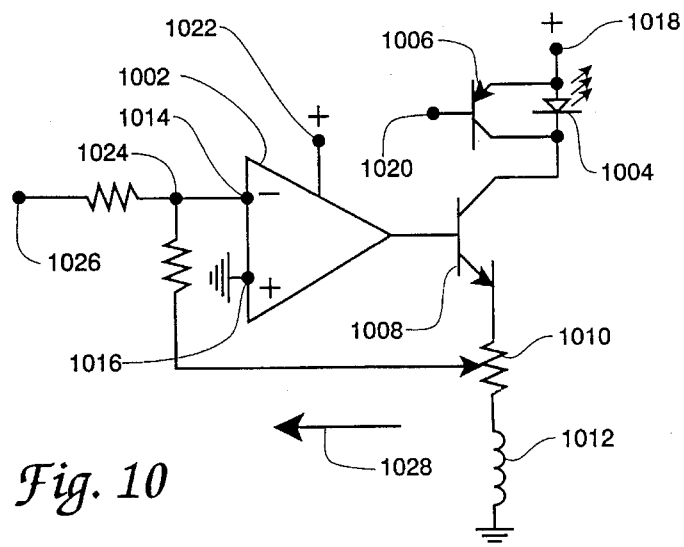
FIG. 10 shows an electrical circuit which may be used to control individual elements in the FIG. 3–FIG. 8 arrays.

The FIG. 2 drawing shows several additional components used in embodying the invention, these additional components include a control apparatus 202 for each element of the test pattern-generating array 201, a source of electrical energy 205 for the control apparatus 202 and the array elements, the night vision device under test 208 and an observer or user 207 of the FIG. 2 apparatus. The control apparatus 202 preferably includes ON/OFF switches 204 for each element of the array 201 and an adjustment control 203, such as a potentiometer, for each element of the array 201. The control apparatus 202 may include a plurality of operational amplifiers one for each array element for example for controlling the element's energization amplitude and time duration. An electrical circuit which employs such an operational amplifier in performing array element control is shown in FIG. 10 of the drawings herein.

The adjustment control 203 in the control apparatus 202 in FIG. 2 may be used to select the operating intensity or radiance of each element in the array 201. Such adjustment may be in accordance with the requirements of the night vision device under test, the effect of night vision device to test array separation distance, the effect of any optical filters used and other variables present in a particular testing environment. For some uses of the invention it may be desirable to adjust each element of the array to an operating radiance level using a National Bureau of Standards-traceable radiometer.

Figure 3:
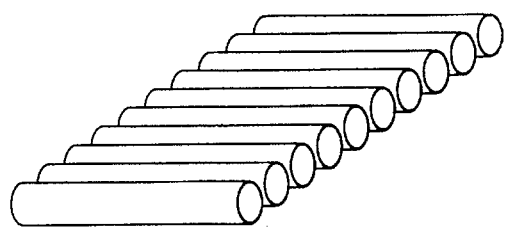
FIG. 3 shows a one dimensional linear arrangement of a test pattern array according to the invention.
Figure 4:
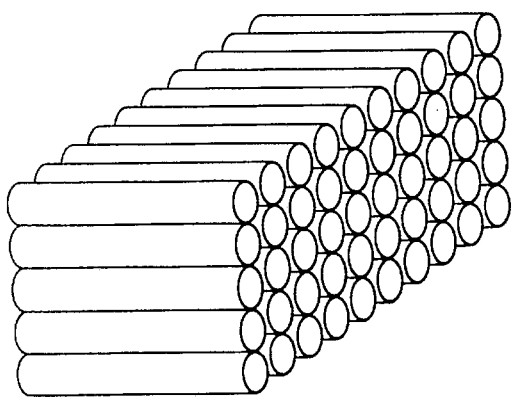
FIG. 4 shows a two dimensional rectangular arrangement of a test pattern array according to the invention.

The manually operated control apparatus 202 shown in FIG. 2 is suitable for use with the small arrays of light emitting diode elements shown in the FIG. 2, FIG. 3, and FIG. 4 drawings. Indeed such control apparatus may be employed with arrays of any desired size so long as time and user patience permit possibly lengthy manual setup procedures to be acceptable in arranging each newly desired test pattern. In instances wherein the night vision device under test is to be subjected to a plurality of different test patterns, however, or is to be subjected to test patterns of considerable intricate detail, it may be desirable to modify the control apparatus 202 to a form which can employ the output signals of a digital computer in arriving at the test pattern. Indeed patterns of even the moderate complexity disclosed in FIG. 5–FIG. 8 herein, are most practically achieved and subjected to changes through the use of such computer control of the employed pattern.

With such computer control the test pattern presented to the night vision device can be quickly changed to identify particular night vision device deficiencies through the use of software routines and other computer-enabled expediencies. A large and detailed test pattern can for example be achieved through the use of repeatedly executed lines of code in a subroutine or a looping arrangement when such a computer is employed. When a computer is used in realizing the invention it may be arranged to control light emitting diode element intensity or radiance in addition to the ON/OFF status of each array element. As is described later herein, the FIG. 10 array element control circuit is arranged in consideration of such computer and software input of both ON/OFF and radiance or intensity information.

Additional components of an embodiment of the invention appearing in the FIG. 2 drawing include a representation of such a test pattern controlling digital computer at 2 10, a digital to analog converter 209 for interfacing the digital computer 210 with an analog signal arrangement of the control apparatus 202, and the indication of five different array element output spectral wavelength values at 206. A representation of the night vision device viewer also appears at 207 in FIG. 2.. The configuration of the array elements shown in FIG. 2 is in keeping with the additional details of these elements which appears in the FIG. 9 drawing herein.

FIG. 3 and FIG. 4 in the drawings show three dimensional or perspective views of alternate light emitting diode or other electrical to optical energy transducer-based arrays which may be used in an embodiment of the invention. The FIG. 4 array is disposed in what may be considered a two dimensional configuration, a configuration which may be helpful in diagnosing night vision device field of view-related problems which extend in multiple directions of the output field. The fifty elements of the FIG. 4 array are sufficient in number to permit a meaningful degree of selection from light emitting diode elements of differing output wavelength and different operating radiance level in achieving a night vision device test pattern as is the intent of the invention.

FIG. 5, FIG. 6, FIG. 7 and FIG. 8 of the drawings show planar or two-dimensional representations of several more array arrangements along with representative element radiance or intensity values which may be advantageously used in generating test patterns for the night vision device evaluation apparatus invention. In these FIG. 5, FIG. 6, FIG. 7 and FIG. 8 drawings an attempt is made to indicate that light emitting diode devices in the achieved array provide both output energy of differing spectral frequency and output energy of differing intensity or radiance and that indeed these two variables may be varied in combination in the elements of an array to generate a particular test pattern. In the FIG. 5 array arrangement light emitting diode devices of adjacent wavelength bands and light emitting diode devices of adjacent intensity or radiance level happen to be located in physically adjacent positions. Although such happenstance provides desirable night vision device output pattern interpretation assistance it is not a requirement of the invention-a fact which is emphasized by the arrays and patterns of the FIG. 6, FIG. 7 and FIG. 8 drawings.

In keeping with this two changing variable nature of the FIG. 5, FIG. 6, FIG. 7 and FIG. 8 drawings, the somewhat rigid drawing requirements of United States patent practice and the present day availability of computer aided patent drawing preparation equipment, a perhaps unusual symbology is used to indicate both wavelength and radiance variation in these drawings. According to this symbology, wavelength of the energy emitted from the FIG. 5 light emitting diode elements is represented by horizontally directed shading lines, lines which are of differing number, i.e. different wavelength in successive circles or pixels along the horizontal axis in FIG. 5. Differing wavelength values are therefore represented at each horizontal position along the bottom edge of FIG. 5 as is indicated by the numeric values along this axis. According to this convention for example the most horizontal line-blackened elements in FIG. 5, the elements along the fight hand edge of the drawing, are representative of the most infra of the infrared wavelengths included in the drawing, or wavelengths in the 1200 nanometers range. Similarly the horizontal line-free elements along the left edge of the FIG. 5 drawing represent the least infra of the wavelengths of the drawing, i.e., wavelengths in the visible portion of the spectrum. The left to right changing number of horizontally directed shading lines intermediate these two extremes therefore represent successively longer wavelengths.

Figure 5:
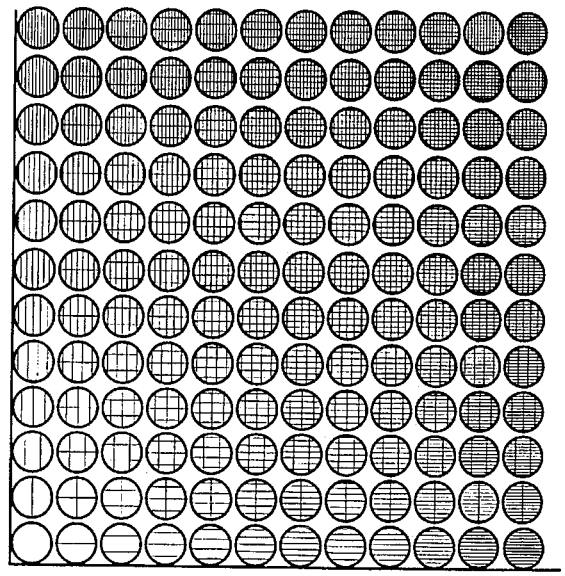
FIG. 5 shows a two dimensional graphic arrangement of a test pattern array according to the invention.

In a similar manner intensity or radiance level in the energy emitted from the light emitting diode elements of the FIG. 5 drawing array is represented by vertically directed shading lines which are of differing number from bottom to top of the FIG. 5 drawing. The greatest number of these shading lines is used to indicate the lowest radiance level, i.e., the most dark of the elements. According to this convention for another example the largely blackened by vertical shading lines elements in the top of the FIG. 5 drawing represent the most dark or lowest radiance of the FIG. 5 elements, and the solid white elements (in so far as vertical lines are concerned) along the lower edge of FIG. 5 represent the brightest or most radiant of the FIG. 5 elements. The bottom to top progression of vertical shading lines intermediate these two extremes therefore represents successively brighter or more radiant array elements. The circle or pixel sizes shown in the FIG. 5–FIG. 8 drawing are of course exemplary and not intended as limitations of the invention. Clearly smaller or larger pixel sizes are within the spirit of the invention.

The FIG. 5 array of light emitting diode elements therefore represents a test pattern of both varying wavelengths and varying intensities or radiances. FIG. 5 also represents a disposal of this pattern in a wavelength-scaled two dimensional rectangular array of organized and progressing change across the field of view of a night vision device. For detecting certain performance degradation in a night vision device this FIG. 5 pattern is desirable, however, other patterns may also be used and are readily achieved with the apparatus of the invention.

It should be appreciated that the physical location of each light emitting diode in an array is fixed once the array is assembled and that only physical movement of the array can change this fixed location with respect to a tested night vision device. The second of the FIG. 5 and also FIG. 6 variables, radiance or intensity of an operating array element, is however not so absolutely fixed in physical position in an array since electrical control of the light emitting diode output level is possible over at least some range and can be used to select an operating intensity for any light emitting diode element of an array. One aspect of this controllable output level appears in FIG. 8 where the pixels of intermediate wavelength and radiance are represented to have a limited range of wavelength and radiance variation, i.e., FIG. 8 does not show pixels having extremes of either variable in the presence of intermediate values of the other variable. This is a matter of drawing convenience in FIG. 8 and several of the other drawings herein and the invention is considered to involve a complete range of both the wavelength and radiance variables in each of the drawing figures. The drawing of FIG. 7 in fact shows the FIG. 6 test pattern modified to include more extreme combinations of wavelength and radiance in a test pattern. In a somewhat related manner it should also be appreciated that the present specification attempts to distinguish between an array of light emitting diode elements or other transducers and the test pattern which is displayed by this array. Once again the transducer array has a limited degree of freedom of alteration however the test pattern displayed on the array is variable as to radiance, test pattern location in the array and other factors.

In testing a night vision device for ability to reproduce pixels of differing input wavelength using the present test pattern it is desirable for an observer to know with certainty that a pixel is missing in the output image and that this pixel was in fact called-for in the dark pixel location of the output image by the input test pattern. Knowledge of the precise location of each input wavelength position-i.e. the location of its input stimulus pixel in the input image, is therefore a desirable attribute of the test patterns shown in FIG. 3, FIG. 4, and FIG. 5 herein. Here an observer need only know that adjacent elements of the array-present wavelength values are separated by for example 10 nanometers of wavelength and that a pixel missing in the image therefore represents an inability of the night vision device to reproduce an input wavelength of a particular value. [Consider for example a wavelength of say 1000 nanometers (whose output image pixel is duly present) and a missing pixel at the next location, i.e. at 1010 nanometers. Knowing the 10 nanometers separation allows early identification of the assumed missing pixel location of 1010 nanometers. Clearly such pixel identification computations are not difficult.]

Figure 6:
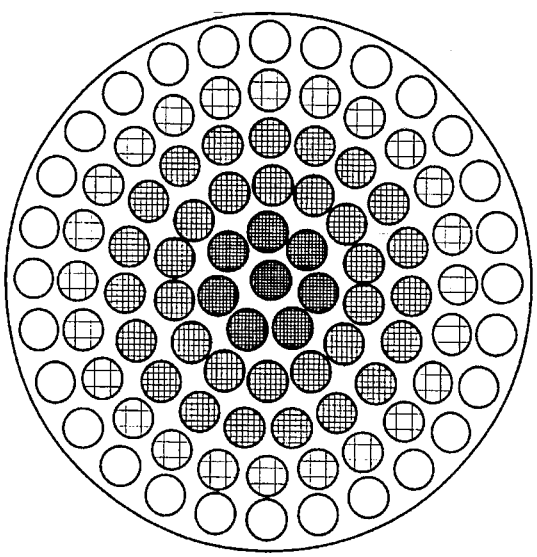
FIG. 6 shows a two dimensional ordered circular arrangement of a test pattern array according to the invention.
Figure 7:
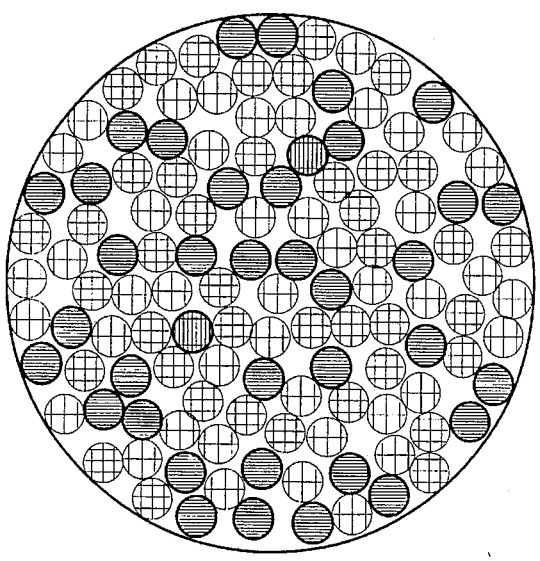
FIG. 7 shows a modification of the FIG. 6 test pattern to represent more extreme combinations of wavelength and radiance or intensity in a test pattern.
Figure 8:
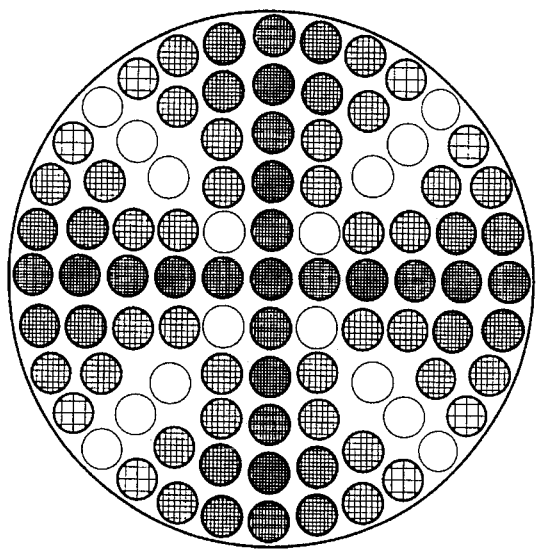
FIG. 8 shows a circular two dimensional specific image arrangement of a test pattern array according to the invention.
Figure 11:
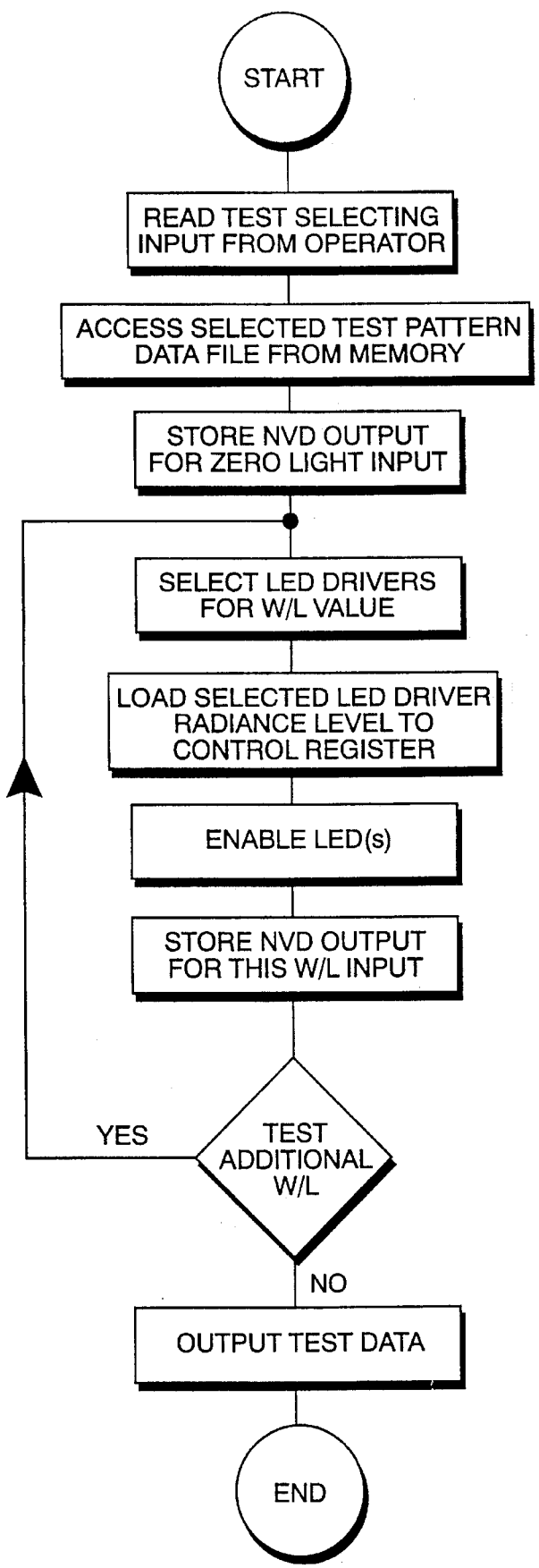
FIG. 11 shows a computer software flow diagram for one arrangement of the invention.

The FIG. 6 and FIG. 7 test patterns are however less convenient for such precise pixel identification purposes (since the relationship between pixel location and wavelength is more complex) and are more useful in verifying that certain input wavelength values can be reproduced at all array locations or at many array locations in the night vision device field of view. Use of the FIG. 5 and FIG. 6 patterns and other more complex patterns for such missing pixel identification purposes is feasible however on a time sequenced basis, i.e., by illumination of each array pixel or each group of pixels of the same wavelength or the same combinations of wavelength desired in an array in a step by step time sequence. FIG. 11 in the drawings shows a computer software flow diagram for such a time sequenced arrangement of the invention.

Complete coverage of the field of view of the night vision device with all possible combinations of wavelength and radiance is however not possible even in the herein illustrated array patterns since, as is alluded-to above, each pixel in the night vision device field of view is stimulated by only a limited number of radiance and wavelength combinations with use of these patterns, i.e., not all possible combinations of wavelength and radiance in each possible pixel location are presented. Rotation or translation of the FIG. 6, FIG. 7 or FIG. 8 test patterns can be used to achieve a more complete coverage of the field of view, i.e., a test pattern element of each variation in each field of view pixel location; such motion can be readily achieved with computer control of the test pattern as provided-for herein.

Figure 9:
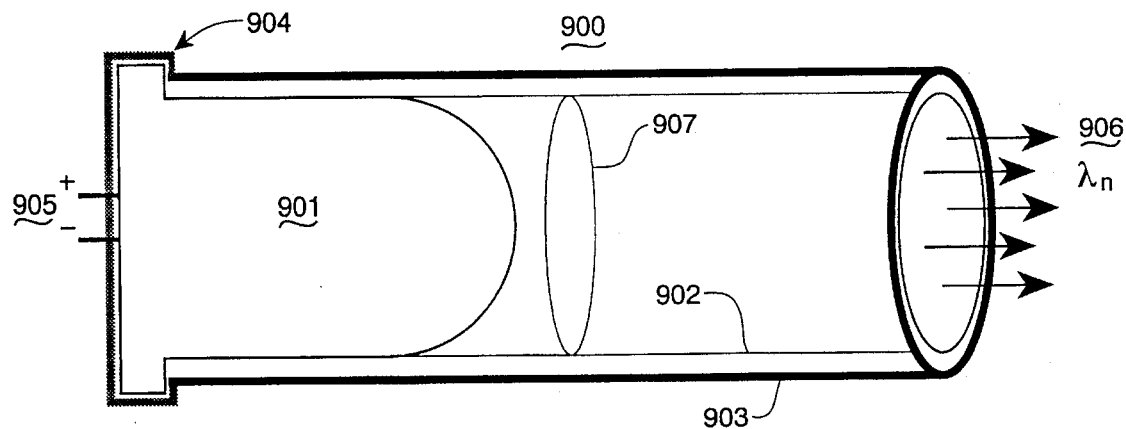
FIG. 9 shows a preferred arrangement of an individual array element in the FIG. 3–FIG. 8 arrays.

FIG. 9 in the drawings shows a preferred arrangement for incorporating a light emitting diode transducer element into a test pattern-reproducing array. In the FIG. 9 drawing a standard package light emitting diode 901 is inserted and glued into a short, light-diffusing white plastic tube 902 of approximately one inch overall length. This light-diffusing white plastic tube 902 is in turn received in a larger close fitting opaque black tube 903 which is terminated at the light emitting diode end with an opaque black cap 904. When needed, to avoid night vision device input port saturation or to achieve a particular radiance level output from an array element, a neutral density filter 907 may be incorporated in the light diffusing white plastic tube 902.

During operation of the FIG. 9 array element the light diffusing white plastic tube 902 serves to direct and concentrate the light emitting diode output energy and the close-fitting opaque black tube 903 and opaque black cap 904 shield the energy output of each diode from leakage into adjacent elements of the array. When electrical energy is applied to the light emitting diode 901 narrow band optical energy of predictable wavelength is emitted from the open end of the light emitting diode 901. White and black Silicone Rubber® may be used advantageously in fabrication of the FIG. 9 structure and in assembling such elements into an array.

FIG. 10 in the drawings shows an operational amplifier-based electrical circuit which may be used to energize and control light emitting diode elements of the FIG. 2–FIG. 8 arrays. The FIG. 10 circuit may be used with either the manual or the computer controlled arrangement of the invention however it appears to be especially helpful in achieving a computer interface with the described array elements. In the FIG. 10 circuit an operational amplifier 1002 is shown to drive an NPN transistor 1008 in a feedback-surrounded constant current generating circuit arrangement. The energized light emitting diode element appears at 1004 in the collector circuit of the NPN transistor 1008 and current flow in this light emitting diode is enabled or turned ON/OFF by a shunting PNP transistor 1006. The current magnitude in the light emitting diode 1004 is determined by a current feedback signal flowing along the path 1028 to the inverting input port 1014 (or the summing node 1024) of the operational amplifier 1002; this current magnitude is adjusted by means of the potentiometer 10 10 and may be subsequently controlled by a signal received at the terminal 1026, a signal which may originate in the controlling computer. Both this current controlling signal and the control signal for the current diverting transistor 1006 may require level conversion as is known in the electrical circuit art in order to achieve a convenient computer interface.

The non inverting input port of the operational amplifier 1002 is shown at 1016 and may be connected to the negative supply terminal or the indicated common ground which connects to the negative supply terminal. This non inverting input terminal 10 16 may also be used as a light emitting diode intensity control, or an ON/OFF control for the connected light emitting diode with suitable circuit modifications. Such uses of an operational amplifier are know in the electrical circuit art. Positive supply connections for the operational amplifier 1002 and the light emitting diode 1004 are indicated at 1022 and 1018 in FIG. 10; a negative supply may be needed for the operational amplifier 1002 depending on the type of amplifier circuit (i.e., the integrated circuit chip) employed. The inductance element at 1012 in FIG. 10 provides signal decoupling and low frequency roll-off of the feedback signal flowing along the path 1028.

An alternate arrangement of the FIG. 10 circuit may be achieved by employing one of the terminals 1024 and 1026 as an input port for both the output current magnitude determining signal received from a computer (or from some other arrangement of the control apparatus 202) and for input of the current ON/OFF control signal of terminal 1020. In such arrangement of the circuit, the output current is essentially controlled down to zero magnitude for a light emitting diode OFF condition and controlled up to the selected magnitude for a light emitting diode ON condition and the transistor 1006 is eliminated. Level adjustment of the signal at terminal 1026 used for this dual purpose may also be needed depending on the computer used, digital signal levels employed and other considerations.

The use of a digital computer as represented at 210 in the FIG. 2 drawing is therefore a helpful and performance increasing aspect of the present invention. Such usage is not essential to the invention as has been emphasized by disclosure of the non computer based control apparatus 202. The computer software code used with a computer inclusive embodiment of the invention, the software resident in the computer 210, may in fact be embodied without a significant degree of experimentation (conceivably in the form of one page of code or less depending on the number of and the complexity of the test patterns desired) in most of the known software languages and by persons of ordinary or even beginning skill in the software art. The exact nature of such software will of course depend on many considerations including the night vision device tests to be performed and the rules of the computer language selected. Significant portions of such software are also known in the computer art and are readily available as end-use items or for use as models in preparing custom tailored software.

The software used in the present invention is also not complex in nature by present-day standards. FIG. 11 of the drawings for example shows an elemental software flow diagram for a serial test, one pixel at a time, embodiment of the invention. This flow diagram also presumes the output of the night vision device is measured with a non scanning measurement device of the type disclosed in the A. R. Pinkus patent which is elsewhere incorporated by reference herein. A similar flow diagram wherein all pixels of the input test pattern are simultaneously energized (which therefore requires scanning of the night vision device output image in order to identify individual input pixel related night vision device output pixels) can be achieved by persons skilled in the computer art by rearranging the indicated program loop to surround the driver selection and driver radiance control blocks in lieu of the longer loop path shown in FIG. 11.

In reality moreover, the herein recited computer and software-inclusive embodiment of the invention is actually a matter of convenience and practicality and may also be replaced by dedicated hardware or some combination of dedicated hardware and even more elementary computer software or by programmed logic arrays or alternately by other arrangements as are known in the electrical art.

In addition to the primary utility of the present invention in evaluating performance of night vision device equipment per se, its use in evaluating the night vision device spectral attenuation characteristics of look-through objects such as an aircraft windscreen or aircraft transparency is also practical. To accomplish such an evaluation a night vision device, preferably a laboratory device, is used to directly view a wide wavelength-range test pattern according to the invention and the results noted or recorded. The same night vision device is then used to view the same test pattern through the aircraft transparency and any spectral response differences in the night vision device output image is noted and attributed to the transparency.

The need for the present night vision device testing equipment, and the nature of night vision device environment constraints which make night vision device characteristics important, is described and shown graphically in a copending United States patent document, Ser No. 08/500, 302 which includes my name as one inventor. This document is also concerned with the subject of night vision device testing and spectral response determination in a night vision device. The contents of this co pending patent document are hereby incorporated by reference herein.

The present invention therefore offers speed, accuracy, and relative simplicity in a night vision device-dedicated spectral test apparatus. The invention also provides a comprehensive evaluation of night vision equipment that is suitable for field use employment. The provided evaluation is indicative of field of view limitations, automatic gain control performance, inactive or weak pixels in the output display of the night vision device and other commonly encountered night vision device difficulties. The disclosed equipment can also be adapted to test night vision equipment of any configuration.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. Night vision device spectral and function performance-verifying apparatus for simulating extended wavelength range and field of view dimension output testing response from a night vision device comprising the combination of:

a plurality of electrical to optical energy transducer devices of periodically incremented wavelength disposed into a night vision device input port-illuminating first specific transducer device location array;

said first array including electrical to optical energy transducer devices of selected different optical output wavelength disposed in a selected pattern configuration within said first array;

a second array of electrical energy-controlling electronic circuits each disposed in electrical energization determining relationship with one of said electrical to optical energy transducer devices in said first array; and a one test pattern from a possible multiple test pattern selection apparatus connected with each of said electrical energy-controlling electronic circuits in determination of each successive test pattern energized within said first array for presentation to said input port of said night vision device.

2. The apparatus of claim 1 wherein said electrical to optical energy transducer devices comprise fight emitting diodes of plural and incremented wavelength spectral range.

3. The apparatus of claim 2 wherein said light emitting diodes have spectral outputs which are separated by wavelength increments to ten nanometers.

4. The apparatus of claim 2 wherein said light emitting diodes have spectral outputs extending into the near infrared ranges of optical energy wavelength.

5. The apparatus of claim 1 wherein said second array of electrical energy-controlling electronic circuits include electrical current magnitude determining electrical circuits also having an ON/OFF determining electrical capability.

6. The apparatus of claim 1 wherein said one test pattern from a possible multiple test pattern selection apparatus comprises one of a manually controllable selection apparatus and a digital computer selection apparatus.

7. The apparatus of claim 1 wherein said night vision device input port-illuminating first array is a two dimensional array extending over a substantial portion of an input field of view of said night vision device.

8. The method of verifying spectral and functional performance of a night vision device comprising the steps of:

forming a planar array of electrical energy to optical energy transducer elements which comprises transducer elements of selected different optical energy output wavelength disposed in selected array position locations;

generating a test pattern of energized array-comprised electrical energy to optical energy transducer elements, said test pattern including energized electrical energy to optical energy transducer elements of selected optical energy output wavelength and selected test pattern physical location;

controlling said test pattern in physical size, shape and spectral content, by electrically selecting one of an illuminated and quiescent state for, and an operating optical energy output intensity for, each electrical to optical energy transducer element in said array;

exposing an optical input port of said night vision device to said array-comprised test pattern of energized electrical energy to optical energy transducer elements; and examining an output image of said night vision device for correct pixel content in correct test pattern-determined location in response to said input port exposure.

9. The method of claim 8 wherein said array of electrical energy to optical energy transducer elements comprises a plurality of light emitting diode optical energy sources.

10. The method of claim 9 wherein said light emitting diodes are of incrementally segregated spectral wavelengths extending between visible and near infrared spectral wavelengths.

11. The method of claim 8 wherein said array-comprised test pattern of energized electrical energy to optical energy transducer elements comprises a two dimensional test pattern of selectable physical size, physical shape, illumination intensity, and spectral content.

12. The method of claim 11 wherein physical size, physical shape, illumination intensity, and spectral content parameters of said test pattern are determined in said controlling step.

13. The method of claim 12 wherein said test pattern parameters of selectable physical size, physical shape, illumination intensity, and spectral content are determined by a manually operable control element in said controlling step.

14. The method of claim 12 wherein said test pattern parameters of selectable physical size, physical shape, illumination intensity, and spectral content are determined by a digital computer during said controlling step.

15. Night vision device spectral and functional performance-verifying apparatus comprising the combination of:

means including a plurality of electrical to optical energy transducer devices disposed into a planar array for illuminating an input port of a night vision device under test;

said planar array including electrical to optical energy transducer devices of selected different night vision device spectrum optical output wavelength disposed in a selected physical location pattern configuration within said planar array;

electrical energy control means including an array of electrical energy-controlling electronic circuits each disposed in electrical energization determining relationship with one of said electrical to optical energy transducer device for determining an OFF, ON, and operating intensity status of each of said electrical to optical energy transducer devices in said array during generation of each night vision device-received test pattern;

test pattern selection means connected with each of said electrical energy-controlling electronic circuits in determination of each successive test pattern energized within said selected physical location planar array for presentation to said port of said night vision device; and means for evaluating an output response of said night vision device in response to each selected test pattern received at said input port.

16. The apparatus of claim 15 wherein said means for evaluating an output response of said night vision device includes means for sensing absence, presence and strength of output image elements generated in response to electrical to optical energy transducer devices of said planar array.

17. The apparatus of claim 16 wherein said test pattern selection means includes a digital computer.

18. The apparatus of claim 15 wherein said test pattern selection mean includes one of means for serially enabling said electrical energy-controlling electronic circuits on a wavelength by wavelength basis and means for simultaneously enabling said electrical energy-controlling electronic circuits on a parallel basis.

* * * * *

UNITED STATES PATENT AND TRADEMARK OFFICE
CERTIFICATE OF CORRECTION

PATENT NO. : 5,567,937
DATED : October 22, 1996
INVENTOR(S) : Alan R. Pinkus

It is certified that error appears in the above-indentified patent and that said Letters Patent is hereby corrected as shown below:

Column 1, line 21, "visual" should be deleted.
Column 1, line 22, ---visual--- should be inserted before "spectral".
Column 1, line 49, "aircraft'" should read ---aircraft's---.
Column 1, line 65, the hyphen in "wave-lengths" should be deleted.
Column 4, line 3, the following paragraph should be inserted:  ---It is another object of the invention to provide a spectral response evaluation apparatus which provides a plurality of individual radiant energy sources.
Column 5, line 52, "filed" should read ---field---.
Column 12, line 53, "response" should read ---responses---.
Column 13, line 8, "fight" should read ---light---.
Column 14, line 33, "device" should read ---devices---.
Column 14, line 43, ---input--- should be inserted before "port".
Column 14, line 55, "mean" should read ---means---.

Signed and Sealed this

Twenty-seventh Day of May, 1997

Attest:

BRUCE LEHMAN

Attesting Officer        Commissioner of Patents and Trademarks